United States Patent
Sjöland

(10) Patent No.: US 12,537,589 B2
(45) Date of Patent: Jan. 27, 2026

(54) FRONT-END ASSEMBLY

(71) Applicant: Telefonaktiebolaget LM Ericsson (publ), Stockholm (SE)

(72) Inventor: Henrik Sjöland, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 57 days.

(21) Appl. No.: 18/577,504

(22) PCT Filed: Jul. 9, 2021

(86) PCT No.: PCT/EP2021/069192
§ 371 (c)(1),
(2) Date: Jan. 8, 2024

(87) PCT Pub. No.: WO2023/280425
PCT Pub. Date: Jan. 12, 2023

(65) Prior Publication Data
US 2024/0364408 A1 Oct. 31, 2024

(51) Int. Cl.
*H04B 7/08* (2006.01)
*H04B 1/18* (2006.01)

(52) U.S. Cl.
CPC ............... *H04B 7/086* (2013.01); *H04B 1/18* (2013.01)

(58) Field of Classification Search
CPC .................................. H04B 7/086; H04B 1/18
See application file for complete search history.

(56) References Cited

U.S. PATENT DOCUMENTS

| 10,587,052 B2 * | 3/2020 | Zihir | H03G 3/3042 |
| 2008/0001810 A1 * | 1/2008 | Forstner | G01S 7/032 |
| | | | 342/175 |

(Continued)

FOREIGN PATENT DOCUMENTS

| CN | 109586044 A | 4/2019 |
| WO | 2015144233 A1 | 10/2015 |

(Continued)

OTHER PUBLICATIONS

Axholt, Andreas , et al., "A 60 GHz Receiver Front-End with PLL based Phase Controlled LO Generation for Phased-Arrays", Proceedings of the Asia-Pacific Microwave Conference, Dept. of electrical- and information technology Lund University, 22100 Lund, Sweden, 2011, 1534-1537.

(Continued)

*Primary Examiner* — Jean B Corrielus
(74) *Attorney, Agent, or Firm* — Murphy, Bilak & Homiller, PLLC

(57) ABSTRACT

The present disclosure presents a front-end assembly (100) for an antenna array. The front-end assembly (100) comprises at least four front-end circuits (200), each operatively connectable to one single antenna element (35) of the antenna array (30) and interconnected to form a matrix structure comprising at least two column signal lines (110) and at least two row signal lines (120). Each front-end circuit (200) comprises a first mixer circuit (210) and a second mixer circuit (220). Said interconnection is formed by at least two first mixer circuits (210) being operatively connected to each other in parallel in each column signal line (110) and at least two second mixer circuits (220) being operatively connected to each other in parallel in each row signal line (120). Further to this, an antenna front-end assembly (10), an integrated circuit, a network node, a (Continued)

wireless device and a method for controlling the front end assembly (100) are presented.

20 Claims, 6 Drawing Sheets

(56) References Cited

U.S. PATENT DOCUMENTS

| | | | |
|---|---|---|---|
| 2009/0102740 A1* | 4/2009 | Rofougaran | H01Q 23/00 343/860 |
| 2013/0113657 A1 | 5/2013 | Behbahani et al. | |
| 2015/0140943 A1* | 5/2015 | Khayrallah | H04B 1/30 455/277.1 |
| 2018/0159244 A1 | 6/2018 | Tzuang et al. | |
| 2020/0235902 A1 | 7/2020 | Montalvo et al. | |
| 2021/0184719 A1* | 6/2021 | Lee | H04B 7/086 |

FOREIGN PATENT DOCUMENTS

| | | |
|---|---|---|
| WO | 2015175349 A1 | 11/2015 |
| WO | 2020074213 A1 | 4/2020 |

OTHER PUBLICATIONS

Cho, Yae Jee, et al., "RF Lens-Embedded Antenna Array for mmWave MIMO: Design and Performance", arXiv, IEEE, Jan. 22, 2018, 1-8.

Jalili, Hossein, et al., A 436-to-467GHz Lens-Integrated Reconfigurable Radiating Source with Continuous 2D Steering and Multi-Beam Operations in 65nm CMOS, IEEE International Solid-State Circuits Conference, University of California, Davis, CA, Feb. 17, 2021, 1-3.

Ratnam, Vishnu V., et al., "Hybrid Beamforming with Selection for Multi-user Massive MIMO Systems", ARXIV.org, May 8, 2018, 1-16.

* cited by examiner

FRONT-END ASSEMBLY

TECHNICAL FIELD

The present disclosure relates to radio front-end assemblies and more precisely to a radio front-end assembly for an antenna array.

BACKGROUND

The carrier frequencies of future wireless communication technologies are anticipated to increase considerably compared to the frequencies presently employed. Carrier frequencies of hundreds of GHz are foreseen to be utilized in 6th generation mobile communications systems, or "6G", and there will be a need to provide wireless devices being able to operate at these frequencies without unduly compromising cost and/or power consumption of the wireless devices.

At these very high frequencies, the wavelengths are in mm region making it possible to provide extremely miniaturized antenna arrays, without compromising the number of antenna elements of each antenna array. As these arrays will be very small, there will be issues with arranging the required radio front-end circuit sufficiently close to the antenna array, and to still provide the required functionality of the radio front-end. In order to provide beam control, i.e. beam scanning, beam forming, beam tracking etc., each antenna element of an antenna array will have to be connected to an individual radio front-end. This will require at least one radio front-end per antenna element, each radio front-end being individually controlled. In order to increase a gain of the antenna array and still allow for beam scanning, lenses may be introduced to provide more directed beams at lower cost In H. Jalili, O. Momeni, "A 436-to-467 GHz Lens-Integrated Reconfigurable Radiating Source with Continuous 2D Steering and Multi-Beam Operations in 65 nm CMOS", ISSCC 2021, a lens-integrated, wideband and reconfigurable 450 GHz 3×7 beam steering array is presented. In this array, each pixel source, or radio front-end, is capable of injection locking to its adjacent cells if they are turned on at the same time. Therefore, single pixels or a subsection of the array can be turned on with phase/frequency locking between the activated cells, firing the beam at the desired directions. This circuit is capable of multi-beam radiation by simultaneous activation of subarrays without intersecting corners. To increase the resolution and cover the blind spots between two adjacent beams produced by individual cells, the two cells can be activated simultaneously, and by controlling their relative phase shift through coupling, the beam is steered within the blind spot.

The cited art presents a self-oscillating source and not a suitable transmitter or receiver for a 6G system.

SUMMARY

It is in view of the above considerations and others, that the various embodiments of this disclosure have been made. The present disclosure therefor recognizes the fact that there is a need for improvement of the existing art described above.

It is a general object of the embodiments described herein to provide a new type of radio front-end assembly which is improved over the prior art and which eliminates or at least mitigates one or more of the drawbacks discussed above. More specifically, an object of the embodiments discussed in this disclosure is to provide a radio front-end assembly which is reduced in size and which enables multi beam communication from one antenna array. This general object has been addressed by the appended independent claims. Advantageous embodiments are defined in the appended dependent claims.

In a first aspect, a front-end assembly for an antenna array is presented. The front-end assembly comprises at least four front-end circuits, wherein each is operatively connectable to one single antenna element of the antenna array and interconnected to form a matrix structure comprising at least two column signal lines and at least two row signal lines. Each front-end circuit comprises a first mixer circuit and a second mixer circuit. Said interconnection is formed by at least two first mixer circuits being operatively connected to each other in parallel in each column signal line, and at least two second mixer circuits are operatively connected to each other in parallel in each row signal line.

In one embodiment, each front-end circuit is individually controllable. This is beneficial as it allows e.g. unused front-end circuits to be powered down saving power.

In one embodiment, the front-end circuits are individually controllable at least in an active state and an inactive state. This is beneficial as it allows e.g. unused front-end circuits to be powered down saving power.

In one embodiment, each first mixer circuit and each second mixer circuit of each front-end circuit is individually controllable. This is beneficial as it allows e.g. unused front-end circuits to be powered down saving power, and also it may be utilized to help solve e.g. reception of conflicting beams.

In one embodiment, each first mixer circuit and each second mixer circuit of each front-end circuit are individually controllable at least in an active state and an inactive state. This is beneficial as it allows e.g. unused front-end circuits to be powered down saving power, and also it may be utilized to help solve e.g. reception of conflicting beams.

In one embodiment, a gain of each first mixer circuit and each second mixer circuit of each front-end circuit is individually controllable.

In one embodiment, the first mixer circuits and the second mixer circuits are current mode mixers. This is beneficial as addition of currents is preferred to addition of voltages, and a controlled bias current may be provided.

In one embodiment, the first mixer circuits and the second mixer circuits are active mixers. This is beneficial as active mixers provide high output impedance, since the mixer core acts as a cascode device. The mixer will then be less dependent on a low line impedance than a passive current mode mixer In one embodiment, the first mixer circuits and the second mixer circuits are Gilbert mixers. This is beneficial as Gilbert mixers provide high output impedance, since the mixer core acts as a cascode device. The mixer will then be less dependent on a low line impedance than a passive current mode mixer In one embodiment, at least one column signal line and/or at least one row signal line are transmission lines. This is beneficial as signals may be routed with controlled loss and reflections, parasitic effects of e.g. mixers may be taken up and modelled in the characteristic impedance.

In one embodiment, the mixer circuits are biased via their respective signal lines. This is beneficial as one common bias source may be provided for all mixer circuits connected to one signal line.

In one embodiment, the bias is provided to each signal line by an associated regulating amplifier configured to provide a substantially constant bias regardless of a number of mixer circuits actively loading the associated signal line. This is beneficial as it is possible to e.g. activate and/or deactivate mixer circuits without affecting the bias of the other circuits connected to the same signal line.

In one embodiment, each of the first mixer circuits and the second mixer circuits are provided with a local oscillator signal.

In one embodiment, the local oscillator signals are derived from a common frequency reference signal.

In one embodiment, the front-end circuits are receiver front-end circuits further comprising a phase locked loop, PLL, and one or more Low Noise Amplifiers, LNAs.

In one embodiment, each front-end circuit is further individually controllable with regards to a gain of the LNA.

In one embodiment, the front-end circuits are further individually controllable at least with regards to a phase of the PLL.

In one embodiment, each row signal line and each column signal line is operatively connected to an edge circuit comprising an analog to digital converter, ADC.

In one embodiment, each edge circuit further comprises at least one of an analogue filter circuit, termination circuit and/or bias circuit.

In one embodiment, the edge circuit operatively connected to the column signal lines is arranged at a first edge of the front-end assembly and the edge circuit operatively connected to the row signal lines is arranged at a second edge of the front-end assembly. The first edge is different from the second edge. This is beneficial as it allows for effective routing of the front-end assembly and enables the arrangement of up to four front-end assemblies close to each other with minimum dead space between adjacent front-end circuits of different front-end assemblies.

In one embodiment, the first edge of the RF front-end assembly is substantially perpendicular to the second edge of the front-end assembly. This is beneficial as it allows for effective routing of the front-end assembly and enables the arrangement of up to four front-end assemblies close to each other with minimum dead space between adjacent front-end circuits of different front-end assemblies.

In one embodiment, the front-end assembly is adapted for an antenna array operating at frequencies above 100 GHz, In one embodiment, the front-end assembly is adapted for an antenna array operating at frequencies above 300 GHz.

In one embodiment, the front-end circuits are p-type and/or n-type FET based front-end circuits. This is beneficial as it allows for easy integration using e.g. a standard CMOS process.

In one embodiment, the front-end circuits are p-type and/or n-type bipolar based front-end circuits.

In one embodiment, the front-end circuits are p-type and/or n-type BiCMOS based front-end circuits.

In one embodiment, each column signal line and each row signal line comprises two or more wires.

In one embodiment, each column signal line and each row signal line comprises two wires.

In one embodiment, each column signal line and each row signal line comprises four or more wires.

In one embodiment, each column signal line and each row signal line comprises four wires.

In second aspect, an antenna front-end assembly comprising at least one front-end assembly according to the first aspect is presented. The antenna front-end further comprises at least one antenna array which in turn comprises a plurality of antenna elements. Each front-end circuit of the RF front-end assembly is operatively connected to at least one antenna element of the antenna array.

In one embodiment, the antenna front-end assembly further comprises four front-end assemblies according to embodiments of the first aspect. The front-end assemblies are arranged such that a third edge of each front-end assembly is facing a fourth edge of another front-end assembly of said four front-end assemblies. This is beneficial as it is possible to place several front-end assemblies close to each other with minimum dead space between adjacent front-end circuits of different front-end assemblies.

In one embodiment, the antenna front-end assembly further comprises at least one lens arranged to focus an incident beam at a focal plane located perpendicularly offset from a top surface of the antenna array. This is beneficial as the lens increases antenna gain and the offset focus enables e.g. beam tracking.

In a third aspect, an integrated circuit comprising at least one front-end assembly according to the first aspect is presented.

In a fourth aspect, an integrated circuit comprising at least one antenna front-end assembly according to the second aspect is presented.

In a fifth aspect, a network node comprising at least one antenna front-end assembly according to the second aspect is presented.

In a sixth aspect, a wireless device comprising at least one antenna front-end assembly according to the second aspect is presented.

In a seventh aspect, a method for beam tracking using a front-end assembly according to the first aspect is presented. The method comprises activating at least two front-end circuits to receive a first beam, and activating at least one additional front-end circuit to receive an additional beam. Further to this, the method comprises, responsive to said at least one of said at least two front-end circuits and said at least one additional front-end circuit share one or more column signal lines and/or one more row signal lines, correlating column signal lines and row signal lines associated with the activated front-end circuits to track at least the first beam.

In one embodiment, the method further comprises activating one or more front-end circuits adjacent to said at least two front-end circuits and/or adjacent to said least one additional front-end circuits. This is beneficial as it assists and simplifies beam tracking.

In one embodiment, the method further comprises, responsive to said at least two front-end circuits and said at least one additional front-end circuit sharing one or more column signal lines or one more row signal lines, deactivating at least one of the mixer circuits for reception of the first beam and/or the additional beam associated with the shared signal lines. This is beneficial as it helps resolve any signaling conflict on the signal lines.

In an eighth aspect, an integrated circuit is presented. The integrated circuit comprises at least one front-end assembly according to the first aspect, and one or more control circuits configured to perform the method according to the seventh aspect.

In a ninth aspect, a network node is presented. The network node comprises at least one antenna front-end assembly according to the second aspect comprising the front-end assembly according to embodiments of the first aspect, and one or more control circuits configured to perform the method according to the seventh aspect.

In a tenth aspect, a wireless device is presented. The wireless device comprises at least one antenna front-end assembly according to the second aspect comprising the front-end assembly according to embodiments of the first aspect, and one or more control circuits configured to perform the method according to the seventh aspect.

In an eleventh aspect, a computer program is presented. The computer program comprises instructions which, when executed on at least one control circuit, cause said at least one control circuit to carry out the method according to the seventh aspect.

In a twelfth aspect, a carrier comprising the computer program of the eleventh aspect is presented. The carrier is one of an electronic signal, an optical signal, a radio signal, or a computer readable storage medium.

BRIEF DESCRIPTION OF THE DRAWINGS

These and other aspects, features and advantages will be apparent and elucidated from the following description of various embodiments; references being made to the appended diagrammatical drawings which illustrate non-limiting examples of how the concept may be reduced into practice.

DETAILED DESCRIPTION OF EMBODIMENTS

Hereinafter, certain embodiments will be described more fully with reference to the accompanying drawings. The invention may, however, be embodied in many different forms and should not be construed as limited to the embodiments set forth herein; rather, these embodiments are provided by way of example so that this disclosure will be thorough and complete, and will fully convey the scope of the invention, such as it is defined in the appended claims, to those skilled in the art.

The term "coupled" is defined as connected, although not necessarily directly, and not necessarily mechanically. Two or more items that are "coupled" may be integral with each other. The terms "a" and "an" are defined as one or more unless this disclosure explicitly requires otherwise. The terms "substantially," "approximately," and "about" are defined as largely, but not necessarily wholly what is specified, as understood by a person of ordinary skill in the art. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method that "comprises," "has," "includes" or "contains" one or more steps possesses those one or more steps, but is not limited to possessing only those one or more steps. The terms "circuit", or "circuitry", when used in this disclosure, are to mean electric circuits that may or may not comprise one or more further components.

The present disclosure aims at providing embodiments enabling a low power circuit architecture that may be combined with a lens, allowing different antenna elements to be activated simultaneously to support transmission and reception enabling beam scanning and beam tracking. Some embodiments will make it possible to concurrently receive more than one beam. It should be mentioned that, due to the reduced size of antennas and lenses at high frequencies, separate arrangements for receive and transmit would be acceptable.

Figure 1:
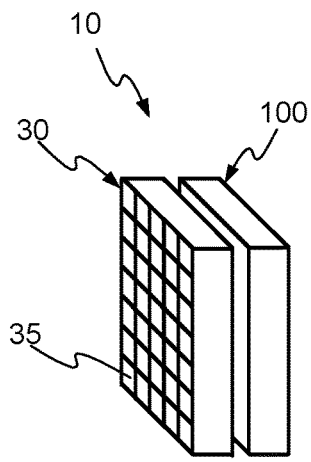
FIG. 1 is a perspective view of an antenna front-end assembly according to some embodiments.

In FIG. 1, an antenna front-end assembly 10 according to an embodiment is illustrated. The antenna front-end assembly 10 comprises a front-end assembly 100 and an antenna array 30. The antenna array 30 comprises a plurality of antenna elements 35 wherein at least some of these antenna elements 35 are operatively connected to the front-end assembly 100. Although FIG. 1 only illustrates one front-end assembly 100 and one antenna array 30 as forming the antenna front-end assembly 10, the skilled person will appreciate, after digesting the teachings of this disclosure, that any suitable number of antenna arrays 30 may be combined with any suitable number of front-end assemblies when forming the antenna front-end assembly 10.

Figure 2:
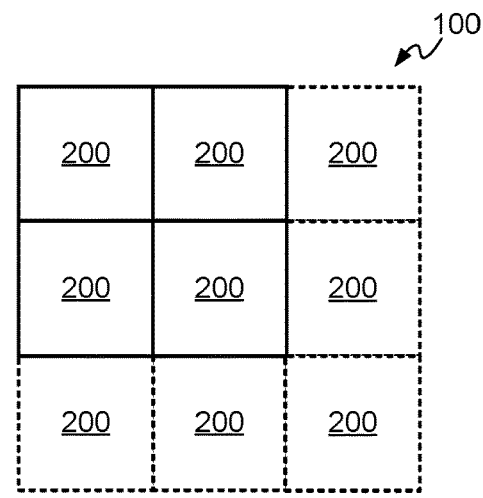
FIG. 2 is a schematic view of a front-end assembly according to some embodiments.

Turning now to FIG. 2, the antenna elements 35 of the antenna array 30 being connected to the front-end assembly 100 are each connected to one front-end circuit 200 of the front-end assembly 100. The front-end assembly 100 may comprise any number of front-end circuits 200, but in preferred embodiments of this disclosure, the front-end assembly comprises at least four front-end circuits 200. The front-end circuits 200 are preferably interconnected and arranged in a matrix structure such that each front-end circuit 200 is adjacent to at least one other front-end circuit 200. Preferably, all rows, and/or all columns of the matric structure have the same number of front-end circuits 200 forming a rectangular or square structure. This is beneficial from a manufacturing perspective and cost perspective as a rectangular or square shape is area efficient and comparably easy to align with the antenna array 30.

Figure 3:
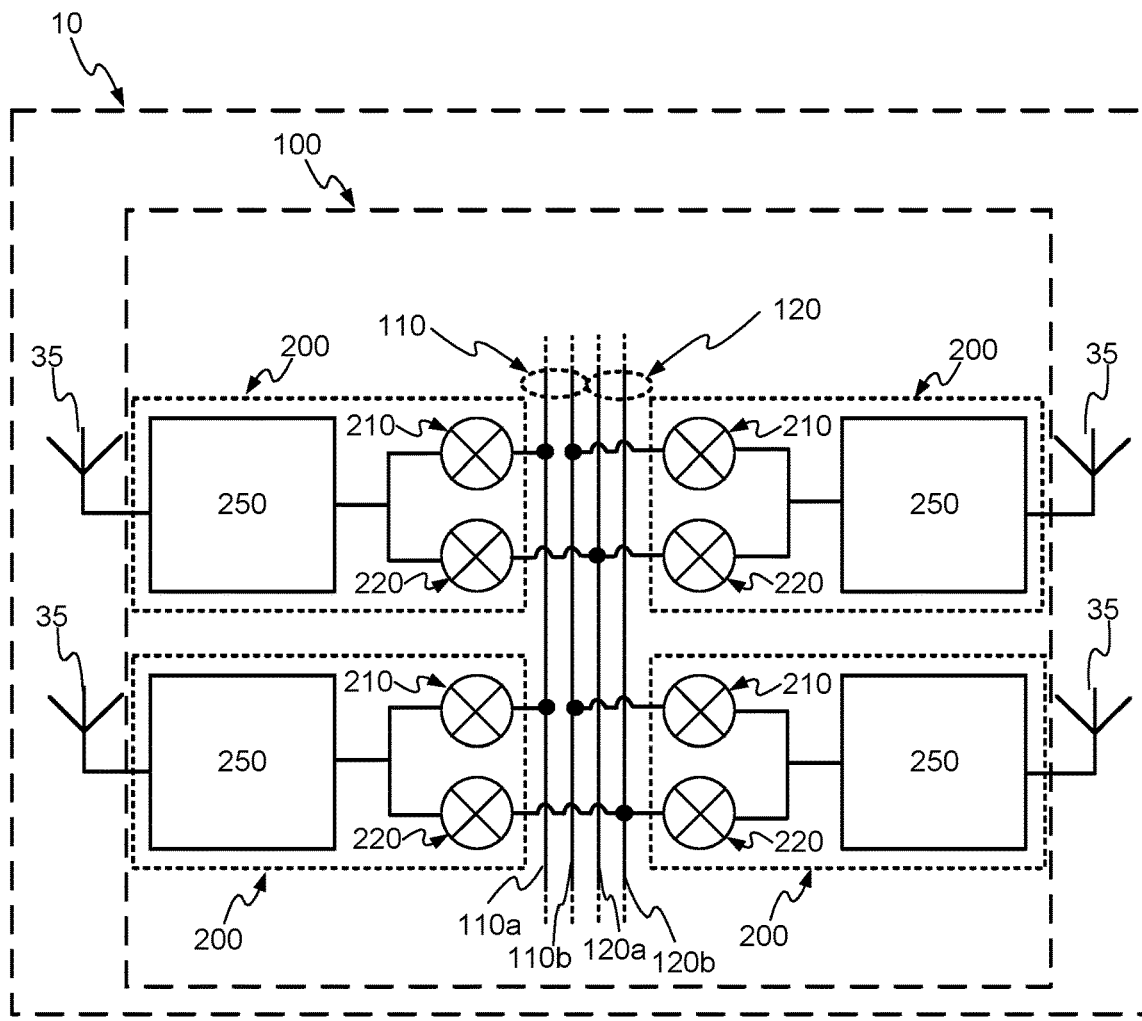
FIG. 3 is a simplified partial block diagram of an antenna front-end assembly according to some embodiments.

With reference to FIG. 3, a partial schematic view of a front-end assembly 10 according to some embodiment, the front-end circuits 200 and their interconnection will be explained in more detail. As mentioned, each antenna element 35 is connected, or connectable, to one front-end circuit 200. The front-end circuit comprises a first mixer circuit 210 and a second mixer circuit 220, both operatively connected to the antenna element 35. In a preferred embodiment of the front-end circuit 200, the front-end circuit 200 comprises a front-end module 250 operatively connecting the antenna element 35 to the first and second mixer circuits 210, 220. In FIG. 3, and in other parts of this disclosure, it may be stated that one, as in singular one, antenna element 35 is operatively connected, or operatively connectable, to one front-end circuit 200. The skilled person will understand, after reading this disclosure, that this may of course entail more than one antenna element 35. This is case in embodiments, covered albeit not explicitly disclosed, comprising e.g. antenna switching etc. The front-end module 250 may be any suitable front-end module 250 comprising circuit, components, integrated circuits (IC) etc. configured for transmit and/or receive operation of the front-end circuit 200. The front-end assembly 100 is formed by interconnecting first mixer circuits 210 in parallel in column signal lines 110, and interconnecting second mixer circuit in parallel in row signal lines 120. As seen in FIG. 3, each column signal line 110a, 110b operatively connects at least two first mixer circuits 210 and each row signal line 120a, 120b operatively connects at least two second mixer circuits 220. In the embodiment of FIG. 3, the first mixer circuits 210 of the two front-end assemblies 200 on the left are interconnected by a first column signal line 110a and the second mixer circuit 220 of the top front-end assemblies 200 are interconnected by a first row signal line 120a. Further to this, the first mixer circuits 210 of the two front-end assemblies 200 on the right are interconnected by a second column signal line 110b and the second mixer circuit 220 of the lower front-end assemblies 200 are interconnected by a second row signal line 120b. As a result, the embodiment of FIG. 3 will form a two by two, 2×2, matrix structure with two first mixer circuits 210 in each of two column signal lines 110, and two second mixer circuits 220 in each of two row signal lines 120.

The front-end assembly of FIG. 3 explain the concept behind interconnection of the front-end circuits 200 and their mixer circuits 210, 220 according to the present disclosure. As the skilled person will understand, the embodiment of FIG. 3 may be extended such that each column signal line 110 and/or each row signal line 120 comprise many more mixer circuits 210, 220 and a number of column signal lines 110 and/or a number of row signal lines 120 may be very high. If the front-end assembly 100 is configured to operate at frequencies in the THz region, antenna elements 35 may be formed as patches, each occupying an area below 200×200 µm$^2$. This means that a 5×5 mm$^2$ antenna array 30 would easily accommodate 25×25=625 antenna elements 35. Accordingly, a front-end assembly 100 for this antenna array 30 will preferably comprise at least 625 front end circuits 200 and 1250 interconnected mixer circuits 210, 220. These mixer circuits 210, 220 are preferably interconnected with 25 mixer circuits 210, 220 in each of 25 column signal lines 110 and 25 row signal lines 120. As will be explained, up to four front-end assemblies 100 may be combined with a dense antenna array 30 further increasing a total number of antenna elements 35 and the front-end circuits 200. A number of front-end assemblies 100 and/or a number of front-end circuits 200 to use depends on chip size, desired scanning range, and lens/reflector parameters which are all design requirements well known to the skilled person whom will be enabled to dimension front-end assemblies 100, front-end circuits 200 or any other embodiment detailed herein after reading this disclosure.

In order to connect the mixer circuits 210, 220 in parallel in row and column signal lines 110, 210, current mode mixer circuits 210, 220 are preferred as summation of currents is more convenient and efficient than summation of voltages. Further to this, the mixer circuits 210, 220 may be configured as active or passive mixer circuits 210, 220, and in a preferred embodiment, the mixer circuits 210, 220 are active mixer circuits 210, 220, e.g. Gilbert mixers. As is further explained in other sections of this disclosure, this is beneficial as a load of an active mixer circuit 210, 220 may also function as a termination of the associated column or row signal line 110, 120.

Figure 4:
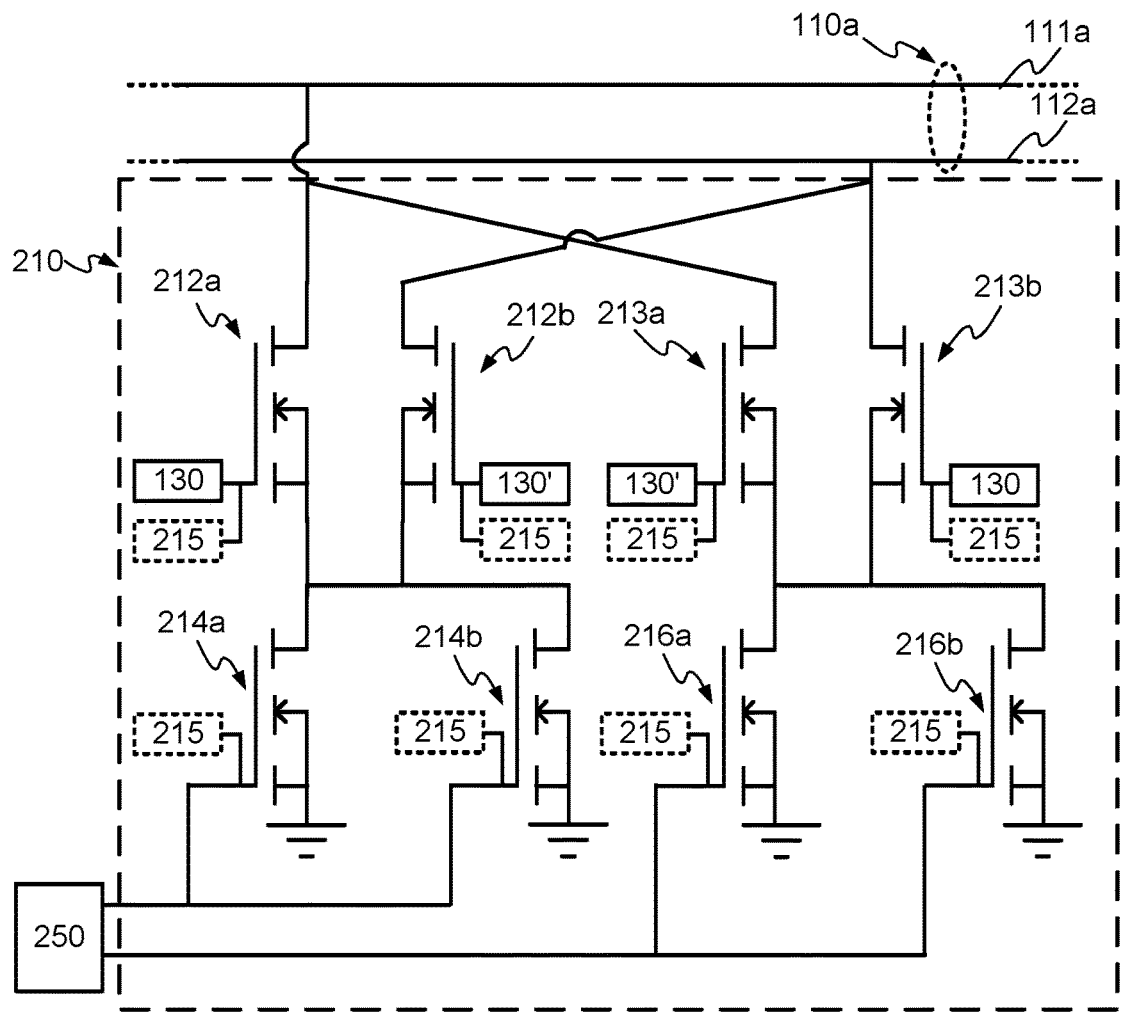
FIG. 4 is a simplified schematic of a mixer circuit according to some embodiments.

With reference to FIG. 4, one preferred embodiment of a first mixer circuit 210 will be explained in more detail. Albeit the mixer circuit of FIG. 4 is referred to as a first mixer circuit 210, the same embodiment is workable for a second mixer circuit 220 with the difference that it would connect to a row signal line 120 rather than a column signal line 110. In other words, the first mixer circuit 210 may be identical to the second mixer circuit 220. The schematic of FIG. 4 is illustrated using Field Effect Transistors (FET), but the skilled person understands that different types of transistors, e.g. bipolar junction transistor (BJT) etc., may also be suitable. The mixer circuit 210 of FIG. 4 is a Gilbert mixer 210 wherein a current switching mixer core is formed by a first source-coupled transistor pair 212a, 212b and a second source-coupled transistor pair 213a, 213b. Output currents of the transistor pairs 212a, 212b, 213a, 213b are summed, resulting in a differential output current, which is injected into the column signal line 110a. This means that, in this embodiment, the column signal line 110a is provided as a differential signal pair comprising two wires 11a, 112a. In other embodiments, each column signal line 110 may be single signal lines, or four signal lines, the latter being the case e.g. if a signal is down-converted to quadrature baseband signals and represent I and Q, each with a differential signal. The same reasoning applies to the row signal line 120.

The source terminals of these switching devices are fed by current from the respective drains of a first transistor pair 214a, 2124b and second transistor pair 216a, 216b. This means that output currents of the first transistor pair 214a, 2124b and the second transistor pair 216a, 216b form source currents for the switching devices in the current switching mixer core. The transistors in the first transistor pair 214a, 214b and the second transistor pair 216a, 216b each appear in parallel with terminals connected together, effectively forming a single transistor with a width that is controllable by a control signal 215. To support higher resolution in the width control, more transistors than two may be used in parallel. The first transistor pair 214a, 214b and the second transistor pair 216a, 216b each form a common source amplifier stage, but with a common mode ground series inductance often present, and given the high operating frequencies, it may also be referred to as a pseudo-differential pair with the first transistor pair 214a, 2124b and the second transistor pair 216a, 216b. The inputs, the gates, of the first transistor pair 214a, 214b and the second transistor pair 216a, 216b may each be connected to the front-end module 250 by a differential signal pair such that one of the signals of the differential signal pair is provided to the first transistor pair 214a, 214b and the other of the signals of the differential signal pair is provided to the second transistor pair 216a, 216b. The transistor pairs 212a, 212b and 213a, 213b are controlled by a local oscillator signal 130, 130', wherein a first differential local oscillator signal phase 130 may be provided to one of the transistors 212a, 213b of each transistor pair 212a, 212b and 213a, 213b and a second differential local oscillator signal phase 130' may be provided to the other one of the transistors 212b, 213b of each transistor pair 212a, 212b and 213a, 213b.

As the skilled person will understand, the circuit in FIG. 4 is a single mixer circuit 210, in this case a double balanced mixer circuit. It is consequently suitable of processing e.g. an intermediate frequency (IF) signal, or one in-phase signal (I) or one quadrature-phase signal (Q). In order to handle both I and Q, e.g. to provide a quadrature output signal, two mixer circuits 210 as those described in FIG. 4 are needed.

In one optional embodiment of the mixer circuit 210 of FIG. 4 and in order to control activation of a front end circuit 200, the transistors of the transistor pairs 212a, 212b and 213a, 213b and/or the first transistor pair 214a, 214b and the second transistor pair 216a, 216b are deactivated by a control signal 215 forcing the gate voltage or gate bias voltage of the transistors low, or high depending on transistor type. The mixer circuits 210, 220 will then effectively act as switches and be present at the column signal line 110 or row signal line 120, only as a parasitic capacitance. By forming the column signal lines 110 and/or row signal lines 120 as transmission lines, the parasitic capacitance of the mixer circuits 210, 220 may be included in a characteristic line impedance of the column signal line 110 or row signal line 120. When just one mixer circuit 210, 220 in the front-end circuit 200 is to be active, the other mixer circuit 210, 220 may be turned off with its first transistor pair 214a, 214b and second transistor pair 216a, 216b, i.e. tail transistors, and the gate bias of its transistor pairs 212a, 212b and 213a, 213b, i.e. LO transistors, is also taken low. For simplicity, the AC-coupling, allowing control of the gate bias voltage, which can be realized with well-known circuit techniques is not illustrated in FIG. 4. In a further embodiment, there may be a switch reducing the LO amplitude applied to the mixer transistors to reduce LO leakage from turned off parts. When a front-end circuit 200 is in full operation, i.e. both its mixers circuits 210, 220 are active, the bias current of each mixer circuit 210, 220 may be controlled by activating different number of tail transistors 214, 216 using the control signal 215. The current and voltage range of the common mode control amplifier in the mixer load may then be reduced by reducing the bias current of each mixer circuit 210, 220 in a row signal line 110/column signal line 120 when several mixer circuits 210, 220 are active.

The mixer circuits 210 embodied in FIG. 4 have several beneficial features, one being a comparably high output impedance, this is due to the mixer core transistors 212, 213 acting as cascode devices. The mixer circuit 210, 220 will then be less dependent on a low line impedance than e.g. a passive current mode mixer. A typical characteristic impedance readily achievable on chip would suffice for the mixer circuit 210 of FIG. 4, that is of the order of 100 Ohms. As mentioned, the output capacitance of the mixer circuits 210, 220 may be included in transmission lines forming the column or row signal lines 110, 120. The mixer circuits 210, 220 may further double as isolation switches for turned off, i.e. inactive, front-end circuits 200, where the mixer transistors are in the off state.

Figure 5:
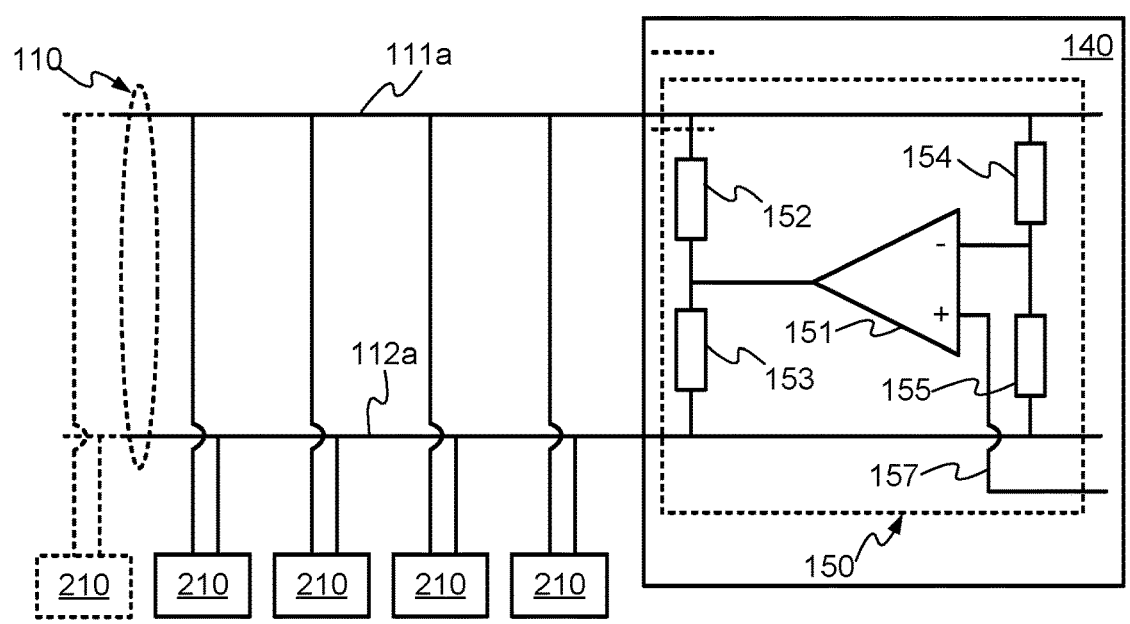
FIG. 5 is a simplified schematic of a bias circuit and an edge circuit according to some embodiments.

The mixer circuits 210, 220 illustrated in FIG. 4 are open drain active mixers, and their respective bias may be provided from their associated column signal line 110 or row signal line 120. Turning to FIG. 5, one embodiment of a bias circuit 150 is illustrated. The bias circuit 150 is arranged to provide a bias voltage to the column signal line 110 and there through bias the first mixer circuits 210 connected to the column signal line 110. The same schematic is applicable also for the row signal lines 120. The bias circuit 150 comprises a first mixer load impedance 152 and a second mixer load impedance 153 connected in series with each other and the series connection is in turn connected between the differential wires of the column signal line 110. The first mixer load impedance 152 and the second mixer load impedance 152 will act as a mixer load to the first mixer circuits 210 connected to the column signal line 110. In a preferred embodiment, the first mixer load impedance 152 has an impedance that is substantially equal to an impedance of the second mixer load impedance 153. Preferably, the mixer load 152, 153 is configured to stabilize a common mode line voltage without introducing differential mode parasitics or disturbances. This may be accomplished by arranging a regulating amplifier 151 with its output connected to a node between the mixer load impedances 152 and 153. In embodiments wherein the load impedances 152, 153 are close to identical, and the rest of the circuitry is substantially differentially symmetrical, this will result in a current injected in that node will appear predominantly in common mode on the column signal line 110. The regulating amplifier 151 may be provided with a first control impedance 154 and a preferably substantially equal second control impedance 155 providing a measure of a common mode voltage of the column signal line 110 that is compared to a reference common mode voltage 157 in order to provide a bias current as an output of the regulating amplifier 151. The reference common mode voltage 157 may be a fixed reference level or a configurable reference level controllable by a controller or any other suitable control device. The use of a regulating amplifier 151 for the bias circuit 150 provides a substantially constant bias voltage to each active mixer circuit 210, 220 regardless of a number of mixer circuits 210, 220 actively loading the associated signal line 110, 120. In other words, the bias voltage and current for each active mixer circuit 210, 220 will be substantially unchanged as mixer circuits 210, 220 are activated or deactivated depending on scenario.

In other words, in some embodiments, the mixers circuitries 210, 220 are preferably active mixer circuitries 210, 220, and each differential column signal line 110 or row signal line 120 share a mixer load 152, 153, that also terminates the signal line 110, 120. The common mode level of the signal line 110, 120 is controlled by the regulating amplifier 151 setting a potential of the termination resistors 110, 120, so that regardless of a number of active front-end circuits 200 of a signal line 110, 120, the common mode level of the signal line 110, 120 is within a desired range. In further embodiments, a scalable mixer bias current may be added to the bias circuit. The scalable mixer bias current makes it possible to reduce the mixer current when many cells are active in a signal line 110, 120, to reduce the range needed in the regulating amplifier 151.

Consequently, each row and column signal line 110, 120 may be provided with a bias circuit 150. The bias circuits 150 of a front-end assembly 100 may be comprised in an edge circuit 140. This means that each row signal line 120 and each column signal line 110 is operatively connected to the edge circuit 140. The edge circuit 140 may further comprise one or more of an analog to digital converter (ADC), analogue filter circuit, digital baseband signal processing, and/or digital communication circuit and interfaces for devices and/or function internal or external to the front-end assembly 100.

Figure 6:
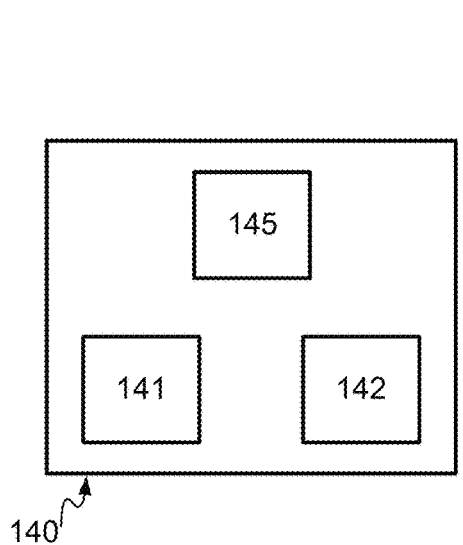
FIG. 6 is a block diagram of an edge circuit according to some embodiments.

With reference to FIG. 6, one embodiment of the edge circuit 140 will be further explained. The edge circuit 140 may comprise a first edge circuit 141 operatively connected to the column signal lines 110 of the front-end assembly 100 and a second edge circuit 142 operatively connected to the row signal lines 120 of the front-end assembly 100. The first edge circuit 141 and the second edge circuit 142 may be substantially identical. Each edge circuit 141, 142 may comprise, for each column signal line 110 or row signal line 120 terminated by the edge circuit 141, 142, one bias circuit 150, one ADC and/or one analogue filter circuit etc. Further to this, the edge circuit 140 may comprise a common edge circuit 145 that may be shared between the first edge circuit 141 and the second edge circuit 142. The common edge circuit 145 may comprise e.g. a common local oscillator, common control blocks etc.

Figure 7:
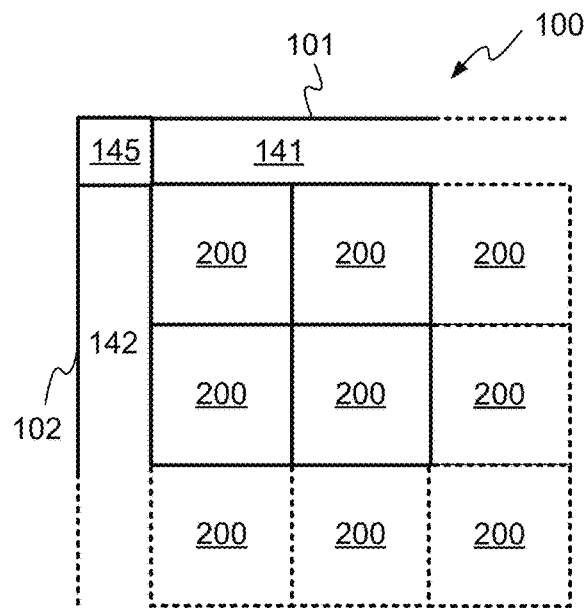
FIG. 7 is a schematic floor-plan view of a front-end assembly according to some embodiments.

In FIG. 7, a front-end assembly 100 is illustrated wherein the first edge circuit 141 operatively connected to the column signal lines 110 is arranged at a first edge 101 of the front-end assembly 100. The second edge circuit 141, operatively connected to the row signal lines 120, is arranged at a second edge 102 of the front-end assembly 100. The first edge 101 is preferably different from the second edge 102. Having the first edge circuit 141 arranged at different edges 101, 102 of the front end assembly 100 allows for e.g. more efficient signal routing. Also, by moving ADCs, filters, mixer loads, digital support circuits etc. to the edges 101, 102 of the front-end assembly 100, a size of the front-end circuits 200 may be reduced and made very small. This simplifies the process of implementing circuits for high mm-wave and THz frequencies.

Figure 8B:
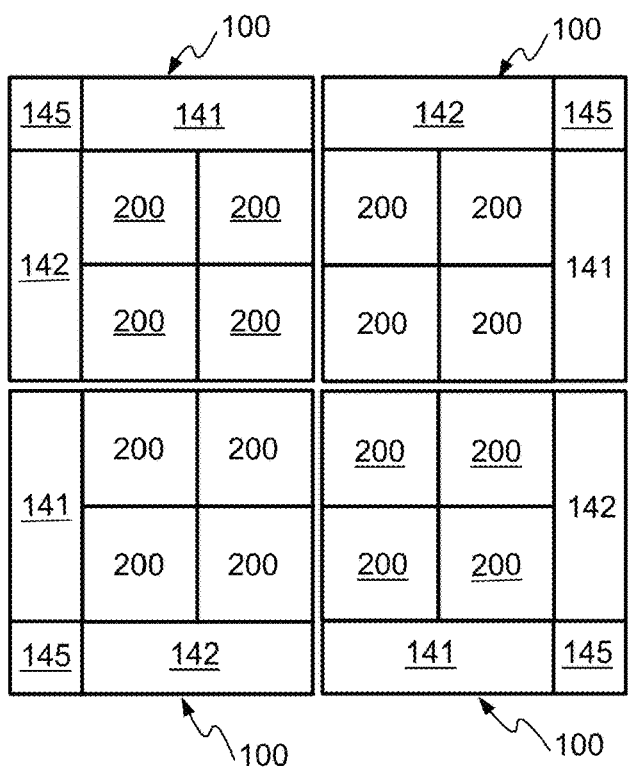
FIG. 8b is a schematic floor-plan view of an arrangement of a plurality of front-end assemblies of FIG. 8a according to some embodiments.
Figure 8A:
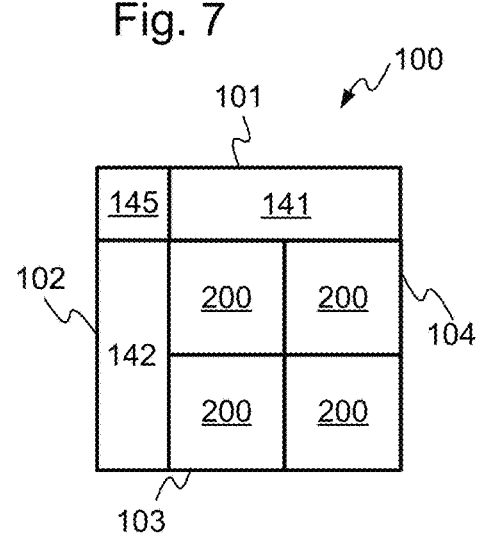
FIG. 8a is a schematic floor-plan view of an exemplary view of a front-end assembly according to some embodiments.

In FIG. 8a, an exemplary front-end assembly 100 is illustrated comprising four front-end circuits 200 arranged in 2×2 matrix structure. Note that this is a comparably minute front-end assembly 100, and albeit fully supported by the present disclosure, used for illustrative purposes only. In this embodiment, the first edge 101 of the front-end assembly 100 is substantially perpendicular to the second edge 102 of the front-end assembly 100. Preferably, front end-circuits of the front-end assembly are consequently arranged substantially all the way up to a third edge 103 and a fourth edge 104 of the front-end assembly 100. By having the first edge circuit 141 arranged at a substantially perpendicular edge 101 to an edge 102 at the second edge circuit 141 makes it, as illustrated in FIG. 8b, possible to arrange up to four front-end assemblies 100 next each other with the front-end circuits 200 arranged tightly next to each other, also between two adjacent front-end assemblies 100. This means that each front-assembly 100 is rotated 90° with regards to the front end-assembles 100 adjacent to it such that the front-end assemblies 100 are arranged with the third edge 103 of each front-end assembly 100 facing the fourth edge 104 of another front-end assembly 100 of the four front-end assemblies 100.

Figure 9:
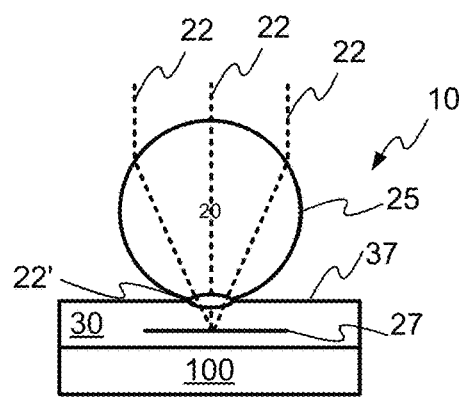
FIG. 9 is a schematic side view of an antenna front-end assembly according to some embodiments.

With reference to FIG. 9, a further embodiment of the antenna front-end assembly 10 will be presented. The antenna front-end assembly 10 comprises at least one front-end assembly 100 connected to an antenna array 30 as explained elsewhere. That is to say, each front-end circuit 200 of the RF front-end assembly 100 is preferably operatively connected to at least one antenna element 35 of the antenna array 30. In some embodiments of the antenna front-end assembly 10, it comprises up to four front end assemblies 100 arranged as illustrated in FIG. 8b, i.e. the front-end assemblies 100 are arranged such that a third edge 103 of each front-end assembly 100 is facing a fourth edge 104 of another front-end assembly 100 of the four front-end assemblies 100.

As mentioned, reflectors or lenses may be introduced at antenna arrays 30 to increase directivity at a reasonable cost. However, reflectors and lenses may severely restrict the beam scanning range. If the antenna array 30 is placed in a focal plane of the lens, there will be a discontinuous beam coverage, i.e. antenna elements 35 of the antenna array 30 will correspond to non-overlapping beams. By placing the antenna elements 35 slightly out of focus, the beams will overlap, and it is possible to continuously steer beams at the expense of a slightly reduced antenna gain.

In one embodiment of the antenna front-end assembly, it further comprises a lens 20. The lens 20 is preferably arranged such that the lens 20 and the front-end assembly 100 will sandwich the antenna array 30. This arrangement of the lens 20 will allow it to focus an incident beam 22 at a focal plane 27 located perpendicularly offset from a top surface 37 of the antenna array 30. The offset may, from the top surface 37 of the antenna array 37, be either a positive or a negative offset. This offset allows the incident beams 22 to be intercepted by more antenna elements 35 of the antenna array 30 in order to ensure a substantially continuous beam coverage capability. Albeit a spherical lens 20 is illustrated in FIG. 9, it should be mentioned that any e.g. converging lens or parabolic reflector will work. One preferred feature is that the antenna array 30 is located near enough the focal plane 27 to achieve high gain from the lens 20. The lens 20 will focus a beam 22 to a small group of antenna elements 35 and their associated front end circuits 200. Other front end circuits 200, typically the vast majority of the front-end assembly 100, not needed for the reception may consequently be powered down, saving substantial power. In the same way, first and second mixer circuits 210, 220 may be powered down to save power.

Figure 10:
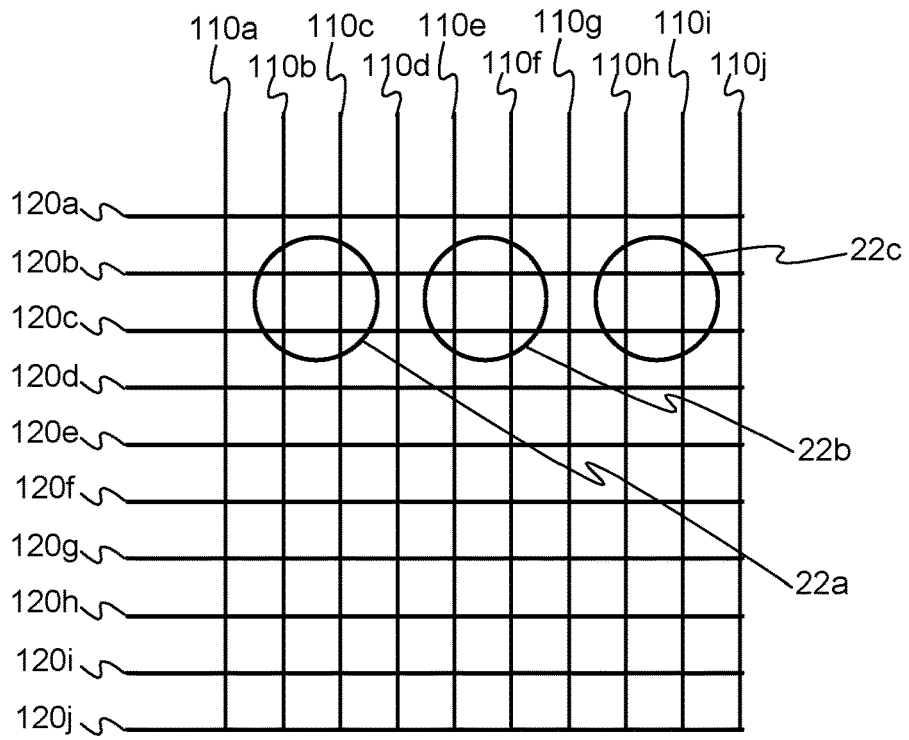
FIG. 10 is a schematic view of a beam constellation on a signal line array according to some embodiments.
Figure 11:
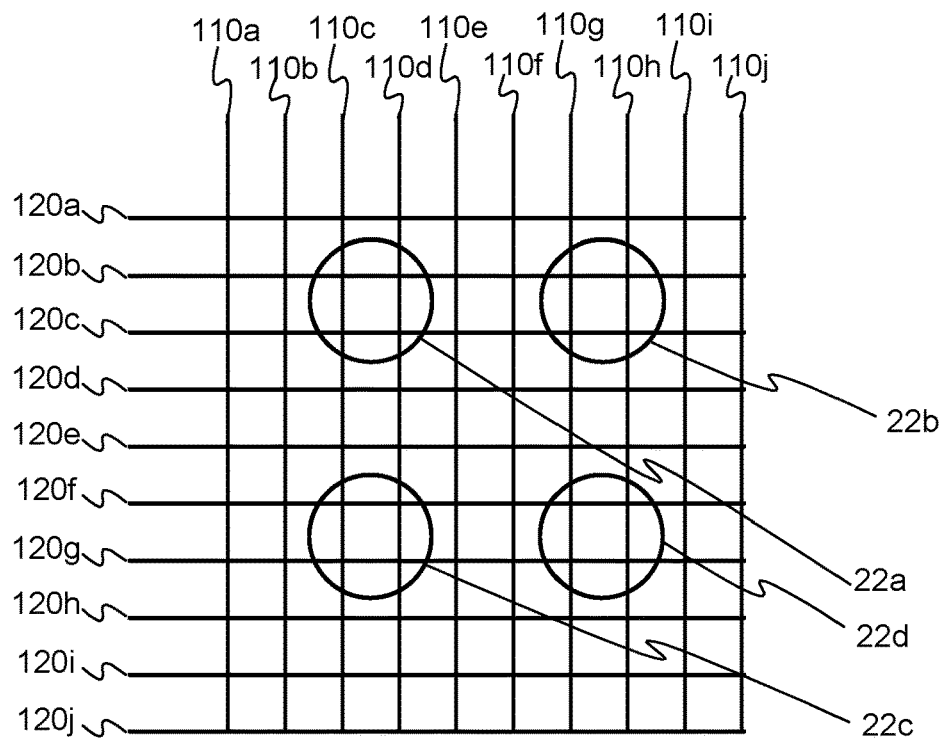
FIG. 11 is a schematic view of a beam constellation on a signal line array according to some embodiments.

With reference to FIGS. 10 and 11, a functional description of an antenna front-end assembly 10 will be given. In the scenario of FIG. 10, ten column signal lines 110a-j are shown together with ten row signal lines 120a-j. As is understood from explanations given elsewhere in this disclosure, each crossing of a column signal line 110a-j and a row signal line 120a-j is represented by an antenna element 35 operatively connected to a front-end circuit 200. Three incident beams 22a-c are illustrated in FIG. 10, wherein all three incident beams 22a-c are received by a second row signal line 120b and a third row signal line 120c. A first incident beam 22a is, in addition to the row signal lines 120b-c, also received by a second column signal line 110b and a third column signal line 110c. A second incident beam 22b is, in addition to the row signal lines 120b-c, also received by a fifth column signal line 110e and a sixth column signal line 110f. A third incident beam 22c is, in addition to the row signal lines 120b-c, also received by an eighth column signal line 120h and a ninth column signal line 110i. This means that all beams 22a-c may provide signals to both column signal lines 110 and row signal lines 120. The row signal lines 120b-c providing the beams 22a-c may be correlated with the signals received by the columns corresponding columns 110b-c, 110e-f, 110h-i. This is useful e.g. for beam tracking purposes. Each beam 22a-c may be tracked by comparing the strengths of the signals in rows and columns. In the example of FIG. 10, wherein several competing signals are present in one or more signal lines 110, 120, beams 22a-c may be tracked by comparing the strength of correlation. It is also possible to activate additional front-end circuit 200 at the edge of one or more beams 22a-c to obtain even more beam tracking information.

Turning to FIG. 11, a slightly different scenario to that of FIG. 10 is illustrated. In this scenario, four beams 22a-d are received. The second and third row signal lines 120b, 120c may receive the first beam 22a and the second beam 22b and a sixth and a seventh row signal line 120f, 120g may receive the third beam 22c and a fourth beam 22d. The third column line 110c and a fourth column line 110d may receive the first and the third beams 22a, 22c, and a seventh and the eighth column signal lines 110g, 110h may receive the second and the fourth beams 22b, 22d. Consequently, there are four beams 22a-c competing for four column signal lines 110c, 110d, 110g, 110h and four row signal lines 120b, 120c, 120f, 120g. In this scenario, the front-end assembly 100 may be configured to turn off, i.e. deactivate some first or second mixer circuits 210, 220. For instance, the front-end assembly 100 may be configured to deactivate the first mixer circuits 210 of the front-end circuits 200 connected to the third and fourth column lines 110c, 110d and the second and third row signal lines 120b, 120c. This means that the first beam 22a may be received only by the second and third row signal lines 120b, 120c. Accordingly, the corresponding first or second mixer circuits 210, 220 of other front-end circuitries 200 may be deactivated such that the second beam 22b is only sensed by the seventh and eighth column signal lines 110g, 110h, the third beam 22c is only sensed by the third and fourth column signal lines 110c, 110d and the fourth beam 22d is only sensed by the seventh and eighth row signal lines 120f, 120g. This scenario resolves conflicting beams in multiple signal lines 110, 120, and to compensate for any loss of tracking direction additional adjacent front-end circuit 200 may be used. For instance, for the first beam 22a, the front-end assembly 100 may be configured to also activate adjacent first mixer circuits 210 of the second and fifth column signal lines 110b, 100e in order to sense an azimuth of the first beam 22a. Correspondingly, second mixer circuits 220 of the first and fourth row signal lines 120a, 120d adjacent to the front-end circuit sensing the second beam 22b, may be activated in order to sense an elevation of the second beam 22b. Alternatively, or additionally, to using additional adjacent front-end circuits 200 to obtain more tracking information, some embodiment may comprise a scheme wherein, alternatingly, each beam 22a-d is received by row signal lines 120 and column signal lines 110. In the example of FIG. 11, all beams 22a-d may alternate simultaneously to avoid signal conflicts, and by combining information from both configurations, it is possible obtain beam tracking information in both azimuth and elevation.

It is worth mentioning that when a front-end circuit 200 is able to use both the first mixer circuit 210 and the second mixer circuit 220 for reception, an accuracy in received signal is increased. This is due to errors in the signals from the respective mixer circuits 210, 220 and their associated circuits are largely uncorrelated which means that summing them will result in a reduction of errors introduced by each mixer circuit 210, 220. Furthermore, by having both first and second mixer circuits 210, 220 the beams 22 may be better tracked in both elevation and azimuth. As has been exemplified, in complicated cases where several beams 22 compete for the same row and column signal lines 110, 120, it may be an option to turn off one mixer circuit 210, 220 for some front-end assemblies 200.

Figure 12:
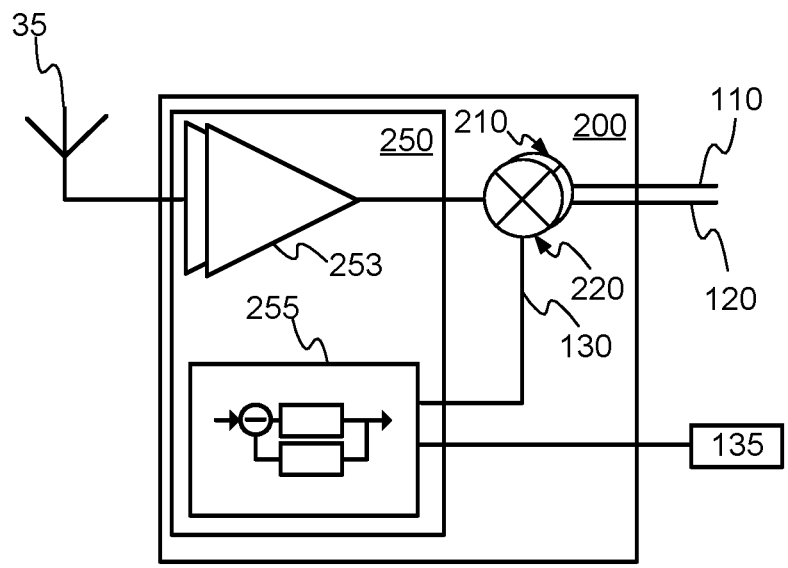
FIG. 12 is a block diagram of a front-end circuit according to some embodiments.

With reference to FIG. 12, a front-end circuit 200 according to one embodiment will be presented. The first mixer circuits 210 and the second mixer circuits 220 are controlled by an LO signal 130. The LO signal may be derived from a common frequency reference signal 135 that may be the same for all front end circuits 200 of a front-end assembly 100, configurable for each front end circuit 200 or commonly configurable for groups of front-end circuits 200. In the embodiment of FIG. 12, the front-end circuit 200 is a receiver front-end circuit 200 and the reference signal 135 may be used as a reference for a phase locked loop (PLL) 255 of the front-end circuit 200. The PLL is preferably arranged to provide the LO signal 130 to the mixer circuits 210, 220 based on the reference signal 135. The PLLs of each front-end circuit 200 of a front-end assembly 100 may be substantially identically configured, or they may be differently configured with regards to e.g. dividers etc. In the embodiment of FIG. 12, the front-end circuit 200 further comprises one or more Low Noise Amplifiers (LNAs) 253. In a further embodiment, the front-end circuits 200 are individually controllable with regards to one or both of a gain of the LNAs 253 and/or a phase of the PLL 255.

It should be mentioned that, when a front-end circuit 200 is to be deactivated or turned off, the first and/or second mixer circuits 210, 220 may be deactivated as explained with reference to FIG. 4, but other parts of the front-end circuit 200 may also be deactivated to further save power. As an example, any PLL 255 and/or LNA 253 of the front-end circuit 200 may also be turned off and any oscillator of the PLL may deactivated.

As seen, the scheme presented within this disclosure is very flexible, embodiments are shown wherein only necessary front-end circuits 200 may be activated, and each front-end circuit 200 may be controlled in phase by its PLL 255 and in amplitude by its amplifiers 253 and/or mixer circuits 210, 220. For one beam 22, several front-end circuits 200 may be in operation, and the signal is obtained by corresponding row and column ADCs. Relative signal strengths between rows and columns may be utilized to indicate the position of the beam 22, and if it has moved, front-end circuits 200 may be turned on or off to adapt to the movement. It is also possible to use extra front-end circuits 200, outside the ones used to receive the beam 22, to obtain additional tracking information. It has been shown that more than one beam 22a-d may be received simultaneously, by activating the corresponding front-end circuits 200. If several beams 22a-d have the same azimuth (or elevation), the column (or row) signal lines 110, 120 may be used to receive the different beams 22a-d. The beam position in elevation (or azimuth) may then be obtained by correlation with the different signals received in azimuth (or elevation). To reduce the risk for overlapping beams in one coordinate, it may be beneficial to rotate the antenna array 30. In difficult scenarios it may also be beneficial to turn off some of the first or second mixer circuits 210, 220 in some front-end circuits 200.

Figure 13:
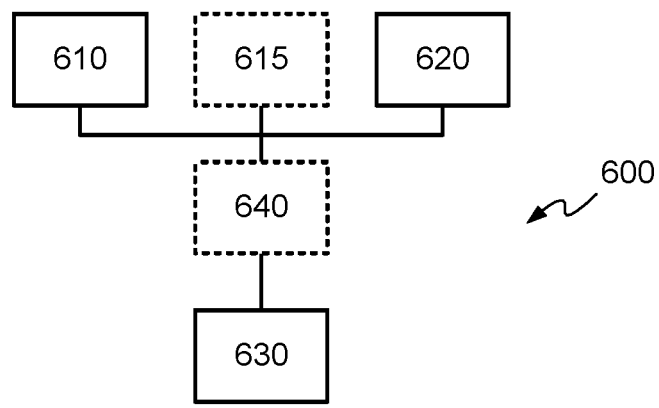
FIG. 13 is a simplified flowchart of a method according to some embodiments.

With reference to FIG. 13, a method 600 for beam tracking will be explained. The method 600 is preferably performed using the front-end assembly 100 according to embodiments wherein the front-end circuits 200 are individually controllable at least in an active state and an inactive state. The method 600 comprises the activation 610 of at least two front-end circuits 200, to receive a first beam 22a. Further to this, the method 600 comprises the activation 620 of at least one additional front-end circuit 200 to receive an additional beam 22b-d. If any of the activated 610 at least two front-end circuits 200, and the at least one additional front-end circuit 200, share one or more column signal lines 110a-j and/or one more row signal lines 120a-j, the method 600 may further comprise the correlation 630 of column signal lines 110a-j and row signal lines 120a-j associated with the activated mixers 210, 220 to be able to track at least the first beam 22a.

In an optional embodiment of the method 600, it further comprises the activation 615 of one or more front-end circuits 200 located, in the front-end assembly 100, adjacent to the at least two front-end circuits 200 and/or adjacent to said least one additional front-end circuit 200. This enables, as mentioned in reference to e.g. FIG. 11, the gathering of additional information relating to the beam 22 and helps track e.g. azimuth and/or elevation of the beam.

Additionally, or optionally, in scenarios wherein the at least one front-end circuit 200 and the at least one additional front-end circuit 200 share one or more column signal lines 110a-j or one more row signal lines 120a-j, the method 600 may further comprise deactivation 640 of at least one of the mixer circuit 210, 220 for reception of the first beam 22a and/or the additional beam 22b-d associated with the shared signal lines 110a-j, 120a-j. As mentioned, e.g. with reference to FIG. 11, as one of the conflicting mixer circuits 210, 220 is deactivated, the conflict is resolved and both beams 22a-j may be received without interference.

Figure 14A:
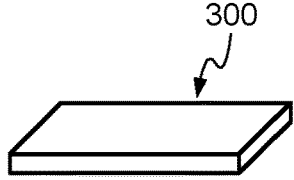
FIGS. 14a-c are views of an integrated circuit according to some embodiments.
Figure 14B:
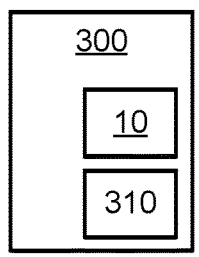
Figure 14C:
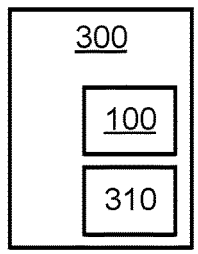

In FIG. 14a, an integrated circuit 300 comprising at least one antenna front-end assembly 10 is illustrated. In FIG. 14b another embodiment of the integrated circuit 300 is illustrated comprising at least one antenna front-end assembly 10, in turn comprising a front-end assembly 100 wherein each front-end circuit 200 is individually controllable. In FIG. 14c, another embodiment of the integrated circuit 300 is illustrated comprising at least one front-end assembly 100, wherein each front-end circuit 200 is individually controllable. Further to this, the integrated circuits 300 of FIG. 14b-c may comprise one or more control circuits 310 configured to perform the method 600 as embodied in this disclosure.

Figure 15A:
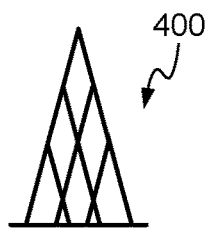
FIGS. 15a-b are views of a network node according to some embodiments.
Figure 15B:
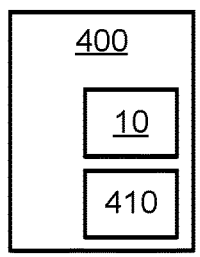

In FIG. 15a, a network node 400 comprising at least one antenna front-end assembly 10 is illustrated. In FIG. 15b, another embodiment of the network node 400 is illustrated comprising at least one antenna front-end assembly 10, in turn comprising a front-end assembly 100 wherein each mixer circuit 210, 220 is individually controllable. Further to this, the network node 400 comprises one or more control circuits 410 configured to perform the method 600 as embodied in this disclosure.

Figure 16A:
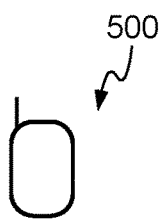
FIGS. 16a-b are views of a wireless device according to some embodiments.
Figure 16B:
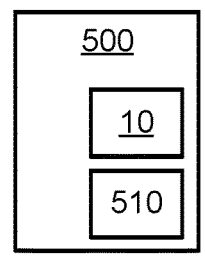

In FIG. 16a, a wireless device 500 comprising at least one antenna front-end assembly 10 is illustrated. In FIG. 16b, another embodiment of the wireless device 500 is illustrated comprising at least one antenna front-end assembly 10, in turn comprising a front-end assembly 100 wherein each mixer circuit 210, 220 is individually controllable. Further to this, the wireless device 500 comprises one or more control circuits 510 configured to perform the method 600 as embodied in this disclosure.

Figure 17:
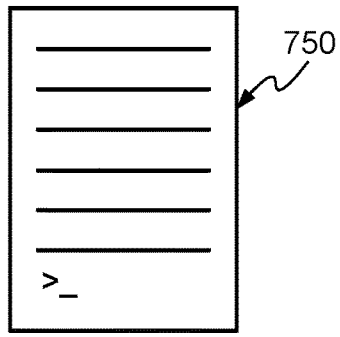
FIG. 17 is a schematic view of a computer program according to some embodiments.

FIG. 17 is schematic view of a computer program 750 comprising instructions which, when executed on at least one control circuit 310, 410, 510, cause said at least one control circuit 310, 410, 510 to carry out the method 600 as embodied in this disclosure.

Figure 18:
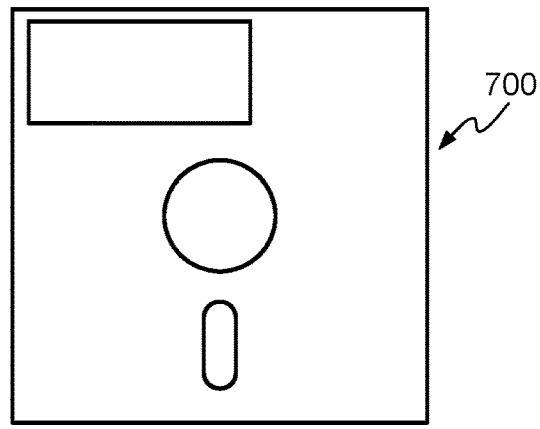
FIG. 18 is a schematic view of a carrier according to some embodiments.

FIG. 18 is a schematic view of a carrier 700 comprising the computer program 750 as described with reference to FIG. 17. The carrier 700 may be either one of e.g. an electronic signal, an optical signal, a radio signal, or a computer readable storage medium.

While the focus of the present disclosure has been on receivers, it should be emphasized that it is workable also for transmitters. Due to the fact that the front-end assembly 100 of the present disclosure may be configured such that only one single front-end circuit 200 will participate in forming a beam 22, a total radiated power may be limited compared to a phased array system without a lens 20. However, the power consumption will be much lower, and an antenna gain may be comparably high although only a few antenna elements 35 are used, this is due to the lens 20. The use of row signal lines 120 and column signal lines 110 would also, in a transmitter, benefit multi-beam operation. Similarly to what has been presented, also in transmitters active mixer circuits 210, 220 may be used with the rows and columns connected to the gates of the tail transistors, presenting the line with parasitic capacitances that can be embedded in it. Also in a transmitter embodiment, AC-coupling may be utilized to turn mixer circuits 210, 220 on/off and scale their bias current and gain.

It should be noted that if a wider beam 22 is desired, in transmit or receive, or a particular beam shape, a corresponding pattern of front-end circuits 200 may be activated. Since the antenna array 30 is near the focal plane 27 of the lens 20, if front-end circuits 200 are operated in nearly the same phase, a beam shape that closely resembles the front-end circuits 200 pattern will be provided. This may be attractive during e.g. beam scanning, and to tailor the beam shape to a particular scenario, for instance covering an expected movement direction, or avoiding a certain beam direction.

Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. For example, while embodiments of the invention have been described with reference to communication at mm waves and above, there may be uses at much lower frequencies. Furthermore, although specific terms may be employed herein, they are used in a generic and descriptive sense only and not for purposes of limitation. Therefore, a person skilled in the art would recognize numerous variations to the described embodiments that would still fall within the scope of the appended claims. Furthermore, although individual features may be included in different claims (or embodiments), these may possibly advantageously be combined, and the inclusion of different claims (or embodiments) does not imply that a combination of features is not feasible and/or advantageous. In addition, singular references do not exclude a plurality. Finally, reference signs in the claims are provided merely as a clarifying example and should not be construed as limiting the scope of the claims in any way.

The invention claimed is:

1. A front-end assembly for an antenna array, wherein the front-end assembly comprises at least four front-end circuits, each operatively connectable to one single antenna element of the antenna array and interconnected to form a matrix structure comprising at least two column signal lines and at least two row signal lines,
  each front-end circuit comprises a first mixer circuit and a second mixer circuit, wherein said interconnection is formed by at least two first mixer circuits being operatively connected to each other in parallel in each column signal line and at least two second mixer circuits being operatively connected to each other in parallel in each row signal line.

2. The front-end assembly of claim 1, wherein each front-end circuit is individually controllable.

3. The front-end assembly of claim 2, wherein the at least four front-end circuits are individually controllable at least in an active state and an inactive state.

4. The front-end assembly of claim 2, wherein each first mixer circuit and each second mixer circuit of each front-end circuit is individually controllable.

5. The front-end assembly of claim 4, wherein each first mixer circuit and each second mixer circuit of each front-end circuit are individually controllable at least in an active state and an inactive state.

6. The front-end assembly of claim 1, wherein the first mixer circuits and the second mixer circuits are current mode mixers.

7. The front-end assembly of claim 1, wherein at least one column signal line and/or at least one row signal line are transmission lines.

8. The front-end assembly of claim 1, wherein each of the first mixer circuits and the second mixer circuits are provided with a local oscillator signal.

9. The front-end assembly of claim 8, wherein each of the local oscillator signals are derived from a common frequency reference signal.

10. The front-end assembly of claim 1, wherein the at least four front-end circuits are receiver front-end circuits, wherein each of the receiver front-end circuits comprises a phase locked loop (PLL) and one or more Low Noise Amplifiers (LNAs).

11. The front-end assembly of claim 10, wherein each front-end circuit is further individually controllable with regards to a gain of a respective LNA.

12. The front-end assembly of claim 10, wherein the at least four front-end circuits are further individually controllable at least with regards to a phase of the PLL.

13. The front-end assembly of claim 1, wherein each row signal line and each column signal line is operatively connected to an edge circuit comprising an analog to digital converter (ADC).

14. The front-end assembly of claim 13, wherein the edge circuit operatively connected to the column signal lines is arranged at a first edge of the front-end assembly and the edge circuit operatively connected to the row signal lines is arranged at a second edge of the front-end assembly, wherein the first edge is different from the second edge.

15. The front-end assembly of claim 14, wherein the first edge of the front-end assembly is substantially perpendicular to the second edge of the front-end assembly.

16. An antenna front-end assembly comprising the front-end assembly of claim 1, and at least one antenna array comprising a plurality of antenna elements, wherein each front-end circuit of the front-end assembly is operatively connected to at least one antenna element of the antenna array.

17. The antenna front-end assembly of claim 16, further comprising at least one lens arranged to focus an incident beam at a focal plane located perpendicularly offset from a top surface of the antenna array.

18. A network node comprising at least one antenna front-end assembly according to claim 16.

19. A wireless device comprising at least one antenna front-end assembly according to claim 16.

20. An antenna front-end assembly arrangement comprising four front-end assemblies according to claim 1, wherein the front-end assemblies are arranged such that a first edge of each front-end assembly is facing a second edge of another front-end assembly of said four front-end assemblies.

* * * * *